United States Patent
Marvi et al.

(10) Patent No.: US 12,173,734 B2
(45) Date of Patent: Dec. 24, 2024

(54) ROBOTIC DEVICES USING MAGNETIC FIELDS FOR THREE-DIMENSIONAL CONTROL OF FLUIDS

(71) Applicant: Arizona Board of Regents on behalf Arizona State University, Scottsdale, AZ (US)

(72) Inventors: Hamidreza Marvi, Chandler, AZ (US); Reza Shirsavar, Mesa, AZ (US); Mahdi Ilami, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 345 days.

(21) Appl. No.: 17/583,294

(22) Filed: Jan. 25, 2022

(65) Prior Publication Data

US 2022/0252091 A1    Aug. 11, 2022

Related U.S. Application Data

(60) Provisional application No. 63/146,384, filed on Feb. 5, 2021.

(51) Int. Cl.
| | |
|---|---|
| *F15D 1/00* | (2006.01) |
| *B25J 9/00* | (2006.01) |
| *B25J 15/00* | (2006.01) |
| *B25J 18/00* | (2006.01) |

(52) U.S. Cl.
CPC .............. *F15D 1/00* (2013.01); *B25J 9/0084* (2013.01); *B25J 15/0019* (2013.01); *B25J 18/00* (2013.01)

(58) Field of Classification Search
CPC ....... F15D 1/00; B25J 9/0084; B25J 15/0019; B25J 18/00
See application file for complete search history.

(56) References Cited

U.S. PATENT DOCUMENTS

| | | |
|---|---|---|
| 4,802,642 A | 2/1989 | Mangiarotty |
| 5,273,465 A | 12/1993 | Meng |
| 5,320,309 A | 6/1994 | Nosenchuck et al. |
| 6,733,172 B2 | 5/2004 | Lee et al. |

(Continued)

FOREIGN PATENT DOCUMENTS

| | | |
|---|---|---|
| DE | 102018105700 A1 | 9/2019 |
| EP | 0664757 A1 | 8/1995 |

OTHER PUBLICATIONS

Amirouche, F. et al., "Current micropump technologies and their biomedical applications," Microsystems Technology, vol. 15, Feb. 2009, Springer-Verlag 2009, 20 pages.

(Continued)

*Primary Examiner* — Adam R Mott
*Assistant Examiner* — Ricardo I Viscarra
(74) *Attorney, Agent, or Firm* — Withrow & Terranova, P.L.L.C.; Vincent K. Gustafson

(57) ABSTRACT

A flow control system for three-dimensional (3D) control of fluids with a high spatiotemporal resolution using alternating magnetic fields is disclosed. This technology is applicable to many disciplines, including fluid dynamics, microfluidics, electrochemistry, metallurgy, and healthcare. In particular, the proposed technique can address challenging problems such as turbulence control, drag reduction, contactless mixing, crystal growth control, and targeted drug delivery.

22 Claims, 7 Drawing Sheets

(56) References Cited

U.S. PATENT DOCUMENTS

| | | | |
|---|---|---|---|
| 7,241,113 | B2 | 7/2007 | MacManus |
| 10,471,599 | B1* | 11/2019 | Guerin ................... B25J 9/0093 |
| 2011/0297239 | A1* | 12/2011 | Nikrityuk .............. B22D 27/02 137/13 |
| 2018/0056524 | A1* | 3/2018 | Birkmeyer ................ B66C 1/06 |
| 2018/0318920 | A1* | 11/2018 | Dahlgren ................ F27D 27/00 |

OTHER PUBLICATIONS

Amjadi, A. et al., "A liquid film motor," Microfluid Nanofluid, vol. 6, Sep. 2008, Springer-Verlag, pp. 711-715.

Augustine, N.R. et al., "Rising Above the Gathering Storm: Energizing and Employing America for a Brighter Economic Future," The National Academies Press, 2007, 591 pages.

Barbu, V., "Stabilization of Navier-Stokes Equations," Boletim da Sociedade Paranaense de Matematica, vol. 26, No. 1, Jun. 2008, pp. 107-116.

Blake, L.R., "Conduction and induction pumps for liquid metals," Proceedings of the IEE—Part A: Power Engineering, vol. 104, No. 13, Feb. 1957, pp. 49-67.

Bryndin, E., "Vibration Approach to Coronavirus Detection and Neutralization COVID-19," American Journal of Laboratory Medicine, vol. 5, No. 4, Jul. 2020, pp. 113-117.

Buren, M. et al., "Electromagnetohydrodynamic (EMHD) flow between two transversely wavy microparallel plates," Electrophoresis, vol. 36, Apr. 2015, Wiley-VCH Verlag GmbH & Co. KGaA, pp. 1539-1548.

Charney, J.G. et al., "Numerical Integration of the Barotropic Vorticity Equation," Tellus, vol. 2, No. 4, Nov. 1950, published online Dec. 2016, pp. 237-254.

Chaves, A. et al., "Bulk Flow in Ferrofluids in a Uniform Rotating Magnetic Field," Physical Review Letters, vol. 96, May 2006, The American Physical Society, 4 pages.

Cho, Y.-C. et al., "Adaptive control of low-Reynolds number aerodynamics in uncertain environments: Part 1. Disturbance regimes and flow characteristics," Computers & Fluids, vol. 86, Nov. 2013, Elsevier Ltd., pp. 582-596.

Chorin, A.J., "Numerical Solution of the Navier-Stokes Equations," Mathematics of Computation, Oct. 1968, vol. 22, No. 104, pp. 745-762.

Coron, J.-M. et al., "Local null controllability of the two-dimensional Navier-Stokes system in the torus with a control force having a vanishing component," Journal de Mathématiques Pures et Appliquées, vol. 92, Issue 5, Nov. 2009, Elsevier Masson SAS, pp. 528-545.

Cramer, A. et al., "Frequency dependence of an alternating magnetic field driven flow," Magnetohydrodynamics, vol. 51, No. 1, Jan. 2008, 15 pages.

Davidson, P.A. et al., "An Introduction to Magnetohydrodynamics," American Journal of Physics, vol. 70, No. 781, Jul. 2002, American Association of Physics Teachers, 5 pages.

Daya, Z. et al., "Electroconvection in a Suspended Fluid Film: A Linear Stability Analysis," Physical Review E, vol. 55, Mar. 1997, 35 pages.

Desai, M. et al., "Optimal Controls of Navier-Stokes Equations," SIAM Journal on Control and Optimization, vol. 32, No. 5, Sep. 1994, Society for Industrial and Applied Mathematics, pp. 1428-1445.

Destgeer, G. et al., "Recent advances in microfluidic actuation and micro-object manipulation via surface acoustic waves," Lab on a Chip, vol. 15, No. 13, May 2015, pp. 2722-2738.

Dubovikova, N. et al., "Velocity and flow rate measurement of liquid metal by contactless electromagnetic Lorentz force technique," International Symposium on Liquid Metal Processing & Casting 2015 (LMPC2015), IOP Conference Series: Materials Science and Engineering, vol. 143, 2016, IOP Publishing, 5 pages.

Dufour, S. et al., "Mixing by chaotic advection in a magnetohydrodynamic driven flow," Physics of Fluids, vol. 25, Oct. 2013, AIP Publishing LLC, 17 pages.

Dykeman, E. et al., "Low Frequency Mechanical Modes of Viral Capsids: An Atomistic Approach," Physical Review Letters, PRL 100, 028101, Jan. 2008, The American Physical Society, 4 pages.

Eddington, D.T. et al., "Flow control with hydrogels," Advanced Drug Delivery Reviews, vol. 56, No. 2, Feb. 2004, Elsevier B.V., pp. 199-210.

Faetti, S. et al., "Electrohydrodynamic Flow in Nematic Thin Films with Two Free Surfaces," Journal de Physique Colloques, vol. 40, No. C3, Apr. 1979, 6 pages.

Faetti, S. et al., "Static and dynamic behavior of the vortex-electrohydrodynamic instability in freely suspended layers of nematic liquid crystals," The Journal of Chemical Physics, vol. 79, Nov. 1983, published online Jun. 1998, American Institute of Physics, 10 pages.

Fattorini, H.O. et al., "Existence of Optimal Controls for Viscous Flow Problems," Proceedings: Mathematical and Physical Sciences, vol. 439, No. 1905, Oct. 1992, Royal Society, 23 pages.

Felton, S. et al., "A method for building self-folding machines," Science, vol. 345, No. 6197, Aug. 2014, pp. 644-646.

Ferguson, J.C., "A Numerical Solution for the Barotropic Vorticity Equation Forced by an Equatorially Trapped Wave," A Thesis Submitted in Partial Fulfillment of the Requirements for the Degree of Master of Science in the Department of Mathematics and Statistics, University of Victoria, 2008, 83 pages.

Fernandez-Cara, E. et al., "Local exact controllability of the Navier-Stokes system," Journal de Mathématiques Pures et Appliquées, vol. 83, No. 12, Dec. 2004, Elsevier SAS, pp. 1501-1542.

Fernandez-Cara, E. et al., "Some Controllability Results for the N-Dimenstional Navier-Stokes and Boussinesq Systems with N-1 Scalar Controls," SIAM Journal on Control and Optimization, vol. 45, Issue 1, Feb. 2006, Society for Industrial and Applied Mathematics, pp. 146-173.

Fish, F.E. et al., "Passive and Active Flow Control by Swimming Fishes and Mammals," Annual Review of Fluid Mechanics, vol. 38, Jan. 2006, Annual Reviews, pp. 193-224.

Galpin, J.M. et al., "Liquid-metal flows induced by low-frequency alternating magnetic fields," Journal of Fluid Mechanics, vol. 239, Jun. 1992, published online Apr. 2006, Cambridge University Press, pp. 383-408.

Garnier, N. et al., "Optical Manipulation of Microscale Fluid Flow," Physical Review Letters, vol. 91, No. 5, Aug. 2003, published online Jul. 2003, The American Physical Society, 4 pages.

Ge, L. et al., "A numerical method for solving the 3D unsteady incompressible Navier-Stokes equations in curvilinear domains with complex immersed boundaries," Journal of Computational Physics, vol. 225, Aug. 2007, Elsevier Inc., pp. 1782-1809.

Gedik, E. et al., "Two-dimensional CFD simulation of magnetorheological fluid between two fixed parallel plates applied external magnetic field," Computers & Fluids, vol. 63, Jun. 2012, Elsevier Ltd., pp. 128-134.

Gerbeth, G. et al., "Electromagnetic flow control in metallurgy, crystal growth and electrochemistry," The European Physical Journal Special Topics, vol. 220, Mar. 2013, EDP Sciences, Springer-Verlag, 8 pages.

Ghattas, O. et al., "Optimal Control of Two- and Three-Dimensional Incompressible Navier-Stokes Flows," Journal of Computational Physics, vol. 136, Article No. CP975744, Sep. 1997, Academic Press, pp. 231-244.

Giesecke, A. et al., "Forward and inverse problems in fundamental and applied magnetohydrodynamics," European Physical Journal Special Topics, vol. 220, Mar. 2013, EDP Sciences, Springer-Verlag 2013, pp. 9-23.

Gunzburger, M. et al., "Analysis of an optimal control problem for the three-dimensional coupled modified Navier-Stokes and Maxwell equations," Journal of Mathematical Analysis and Applications, vol. 333, Nov. 2007, Elsevier Inc., pp. 295-310.

Gunzburger, M.D. et al., "The Velocity Tracking Problem for Navier-Stokes Flows with Bounded Distributed Controls," SIAM Journal on Control and Optimization, vol. 37, No. 6, Oct. 1999, Society for Industrial and Applied Mathematics, pp. 1913-1945.

Hawkes, E. et al., "Programmable matter by folding," Proceedings of the National Academy of Sciences of the United States of America (PNAS), vol. 107, No. 28, Jun. 2010, pp. 12441-12445.

(56) References Cited

OTHER PUBLICATIONS

Hinze, M. et al., "Second Order Methods for Optimal Control of Time-Dependent Fluid Flow," SIAM Journal on Control and Optimization, vol. 40, No. 3, Mar. 2001, Society for Industrial and Applied Mathematics, pp. 925-946.

Hoang, V. et al., "Blowup with vorticity control for a 2D model of the Boussinesq equations," Journal of Differential Equations, vol. 264, Issue 12, Jun. 2018, published online Feb. 2018, Elsevier Inc., pp. 7328-7356.

Holmes, D.P. et al., "Control and manipulation of microfluidic ow via elastic deformations," Soft Matter, vol. 9, No. 29, May 2013, Royal Society of Chemistry, pp. 7049-7053.

Huang, X. et al., "Streamwise and spanwise plasma actuators for flow-induced cavity noise control," Physics of Fluids, vol. 20, Mar. 2008, American Institute of Physics, 11 pages.

Ito, K. et al., "Optimal Control of Thermally Convected Fluid Flows," SIAM Journal on Scientific Computing, vol. 19, No. 6, Nov. 1998, Society for Industrial and Applied Mathematics, pp. 1847-1869.

Jeong, K.-U. et al., "Three-dimensional actuators transformed from the programmed two-dimensional structures via bending, twisting and folding mechanisms," Journal of Materials Chemistry, vol. 21, Apr. 2011, published online Feb. 2011, The Royal Society of Chemistry, pp. 6824-6830.

Kanaris, N. et al., "Three-dimensional numerical simulations of magnetohydrodynamic flow around a confined circular cylinder under low, moderate, and strong magnetic fields," Physics of Fluids, vol. 25, Jul. 2013, AIP Publishing, 30 pages.

Koumoutsakos, P., "Vorticity flux control for a turbulent channel flow," Physics of Fluids, vol. 11, No. 2, Feb. 1999, American Institute of Physics, pp. 248-250.

Kummer, M. et al., "OctoMag: An Electromagnetic System for 5-DOF Wireless Micromanipulation," IEEE Transactions on Robotics, vol. 26, No. 6, Dec. 2010, published online Oct. 2010, IEEE, pp. 1006-1017.

Laser, D.J. et al., "A review of micropumps," Journal of Micromechanics and Microengineering, vol. 14, Apr. 2004, Institute of Physics Publishing, pp. R35-R64.

Lawson, N. et al., "Three-dimensional particle image velocimetry: a low-cost 35mm angular stereoscopic system for liquid flows," Optics and Lasers in Engineering, vol. 32, No. 1, Jul. 1999, 19 pages.

Stiller, J. et al., "Liquid metal flows driven by rotating and traveling magnetic fields," The European Physical Journal Special Topics, vol. 220, Mar. 2013, EDP Sciences, Springer-Verlag, pp. 111-122.

Takayanagi, S. et al., "Theoretical Power Output from a Capacitive-Coupled Power Extraction Magnetohydrodynamic Generator with a Sinusoidal Alternating Magnetic Field," Plasma and Fusion Research, vol. 9, 1206094, Jul. 2014, 3 pages.

Taylor, G., "Studies in Electrohydrodynamics. I. The Circulation Produced in a Drop by Electrical Field," Proceedings of the Royal Society A, Mathematical, Physical, and Engineering Sciences, vol. 291, No. 1425, Apr. 1966, Royal Society Publishing, 10 pages.

Therien-Aubin, H. et al., "Shape transformations of soft matter governed by bi-axial stresses," Soft Matter, vol. 11, No. 23, Apr. 2015, The Royal Society of Chemistry, pp. 4600-4605.

Triantafyllou, M.S. et al., "Vorticity Control in Fish-like Propulsion and Maneuvering," Integrative and Comparative Biology, vol. 42, No. 5, Nov. 2002, pp. 1026-1031.

Troltzsch, F. et al., "The SQP Method for Control Constrained Optimal Control of the Burgers Equation," ESAIM: Control, Optimisation and Calculus of Variations, vol. 6, Oct. 2001, EDP Sciences, SMAI, pp. 649-674.

Vazquez, R. et al., "A closed-form full-state feedback controller for stabilization of 3D magnetohydrodynamic channel flow," Journal of Dynamic Systems, Measurement, and Control, vol. 131, Jul. 2009, ASME, 10 pages.

Veroy, K. et al., "Certified real-time solution of the parametrized steady incompressible Navier-Stokes equations: rigorous reduced-basis a posteriori error bounds," International Journal for Numerical Methods in Fluids, vol. 47, Jan. 2005, John Wiley & Sons, Ltd., pp. 773-788.

Wang, B. et al., "An Experimental Prototype of an Innovative Fluid-driven Electromagnetic Stirring Technique," Journal of Iron and Steel Research, International, vol. 23, No. 5, May 2016, pp. 422-427.

Wang, G., "Optimal Controls of 3-Dimensional Navier-Stokes Equations with State Constraints," SIAM Journal on Control and Optimization, vol. 41, No. 2, Jan. 2002, Society for Industrial and Applied Mathematics, pp. 583-606.

Washabauch, A.P. et al., "Electrohydrodynamic traveling-wave pumping of homogeneous semi-insulating liquids," IEEE Transactions on Electrical Insulation, vol. 24, Issue 5, Oct. 1989, pp. 807-834.

Wei, Z. et al., "Hybrid hydrogel sheets that undergo pre-programmed shape transformations," Soft Matter, vol. 10, Sep. 2014, The Royal Society of Chemistry, pp. 8157-8162.

Weier, T. et al., "Control of separated flows by time periodic Lorentz forces," European Journal of Mechanics B/Fluids, vol. 23, No. 6, Nov. 2004, Elsevier SAS, pp. 835-849.

Wondrak, T. et al., "Contactless inductive flow tomography for a model of continuous steel casting," Measurement Science and Technology, vol. 21, Mar. 2010, IOP Publishing, 10 pages.

Xie, T., "Tunable polymer multi-shape memory effect," Nature, vol. 464, Mar. 2010, Macmillan Publishers Limited, pp. 267-270.

Ye, C. et al., "Self-(Un)rolling Biopolymer Microstructures: Rings, Tubules, and Helical Tubules from the Same Material," Angewandte Chemie International Edition, vol. 54, Issue 29, Jul. 2015, Wiley-VCH Verlag GmbH & Co. KGaA, Weinheim, pp. 8490-8493.

Ye, Z. et al., "Micro-manipulation using rotational fluid flows induced by remote magnetic micro-manipulators," Journal of Applied Physics, vol. 112, 064912, Sep. 2012, American Institute of Physics, 8 pages.

Yu, H. et al., ""Real-Time Particle Image Velocimetry for Feedback Loops Using FPGA Implementation,"" Journal of Aerospace Computing, Information, and Communication, vol. 3, No. 2, May 2012, 6 pages.

Yuan, F. et al., "A study of MHD-based chaotic advection to enhance mixing in microfluidics using transient three dimensional CFD simulations," Sensors and Actuators B: Chemical, vol. 238, Jan. 2017, Elsevier B.V., pp. 226-238.

Zahn, M., "Magnetic fluid and nanoparticle applications to nano-technology," Journal of Nanoparticle Research, vol. 3, No. 1, Feb. 2001, Kluwer Academic Publishers, pp. 73-78.

Zeitoun, R.I. et al., "Selective arraying of complex particle patterns," Lab on a Chip, vol. 10, No. 9, May 2010, The Royal Society of Chemistry, pp. 1142-1147.

Zhu, Q. et al., "Three-dimensional flow structures and vorticity control in fish-like swimming," Journal of Fluid Mechanics, vol. 468, Oct. 2002, Cambridge University Press, 28 pages.

Lian, M. et al., "AC electrothermal manipulation of conductive fluids and particles for lab-chip applications," IET Nanobiotechnology, vol. 1, No. 3, Jun. 2007, The Institution of Engineering and Technology, pp. 36-43.

Link, D.R. et al., "Electric Control of Droplets in Microfluidic Devices," Angewandte Chemie International Edition, vol. 45, No. 16, Apr. 2006, Wiley-VCH Verlag GmbH & Co. KGaA, Weinheim, pp. 2556-2560.

Liu, Y. et al., "Self-folding of polymer sheets using local light absorption," Soft Matter, vol. 8, No. 6, Feb. 2012, RSC Publishing, 7 pages.

Liu, Z.-Q. et al., "Water film motor driven by alternating electric fields: Its dynamical characteristics," Physical Review E, vol. 85, Mar. 2012, American Physical Society, 12 pages.

Liu, Z.-Q. et al., "Water film washers and mixers: their rotational modes and electro-hydrodynamical flows induced by square-wave electric fields," Microfluid Nanofluid, vol. 14, Oct. 2012, Springer, 10 pages.

Lum, G.Z. et al., "Shape-programmable magnetic soft matter," Proceedings of the National Academy of Sciences of the United States of America, vol. 113, No. 41, Sep. 2016, 9 pages.

(56) References Cited

OTHER PUBLICATIONS

Maeda, S. et al., "Self-Walking Gel," Advanced Materials, vol. 19, No. 21, Oct. 2007, Wiley-VCH Verlag GmbH & Co. KGaA, Weinheim, pp. 3480-2484.
Martin, D., "Review of Acoustical Patents," The Journal of the Acoustical Society of America, vol. 86, No. 1, Jul. 1989, Acoustical Society of America, p. 450.
Marvi, H. et al., "Actively controlled fibrillar friction surfaces," Applied Physics Letters, vol. 106, Feb. 2015, AIP Publishing LLC, 3 pages.
Marvi, H. et al., "Experimental Investigation of Optimal Adhesion of Mushroomlike Elastomer Microfibrillar Adhesives," Langmuir, vol. 31, Aug. 2015, ACS Publications, 6 pages.
Marvi, H. et al., "Fiberbot: A Miniature Crawling Robot Using a Directional Fibrillar Pad," 2015 IEEE International Conference on Robotics and Automation (ICRA), May 26-30, 2015, Seattle, Washington, IEEE, pp. 3122-3127.
Marvi, H. et al., "Friction enhancement in concertina locomotion of snakes," Journal of the Royal Society Interface, vol. 9, Jun. 2012, The Royal Society Publishing, pp. 3067-3080.
Marvi, H., "Scalybot: A Snake-Inspired Robot With Active Control of Friction," Proceedings of the ASME 2011 Dynamic Systems and Control Conference (DSCC2011), Oct. 31-Nov. 2, 2011, Arlington, VA, USA, ASME, 9 pages.
Marvi, H. et al., "Sidewinding with minimal slip: Snake and robot ascent of sandy slopes," Science, vol. 346, No. 6206, Oct. 2014, pp. 224-229.
Marvi, H. et al., "Snakes mimic earthworms: propulsion using rectilinear travelling waves," Journal of the Royal Society Interface, vol. 10, No. 84, Jul. 2013, The Royal Society Publishing, 12 pages.
Marvi, H. et al., "Snakes move their scales to increase friction," Biotribology, vol. 5, Nov. 2016, Elsevier Ltd., pp. 52-60.
Melcher, J.R. et al., "Electrohydrodynamic and Magnetohydrodynamic Surface Waves and Instabilities," The Physics of Fluids, vol. 4, No. 11, Nov. 1961, American Institute of Physics, pp. 1348-1354.
Melcher, J.R. et al., "Electrohydrodynamic Charge Relaxation and Interfacial Perpendicular-Field Instability," The Physics of Fluids, vol. 12, No. 4, Apr. 1969, American Institute of Physics, pp. 778-790.
Miyashita, S. et al., "An Untethered Miniature Origami Robot that Self-folds, Walks, Swims, and Degrades," 2015 IEEE International Conference on Robotics and Automation (ICRA), May 26-30, 2015, Seattle, WA, USA, IEEE, 7 pages.
Mohr, R. et al., "Initiation of shape-memory effect by inductive heating of magnetic nanoparticles in thermoplastic polymers," Proceedings of the National Academy of Sciences of the United States of America (PNAS), vol. 103, No. 10, Mar. 2006, pp. 3540-3545.
Moreau, E., "Airflow control by non-thermal plasma actuators," Journal of Physics D: Applied Physics, vol. 40, Jan. 2007, IOP Publishing, pp. 605-636.
Morris, S.W. et al., "Electroconvection and Pattern Formation in a Suspended Smectic Film," Physical Review Letters, vol. 65, No. 19, Nov. 1990, American Physical Society, pp. 2378-2381.
Mu, J. et al., "Origami-inspired active graphene-based paper for programmable instant self-folding walking devices," Science Advances, vol. 1, No. 10, Nov. 2015, 9 pages.
Na, J.-H. et al., "Programming Reversibly Self-Folding Origami with Micropatterned Photo-Crosslinkable Polymer Trilayers," Advanced Materials, vol. 27, Issue 1, Jan. 2015, pp. 79-85.
Nacev, A. et al., "Towards Control of Magnetic Fluids in Patients: Directing Therapeutic Nanoparticles to Disease Locations," IEEE Control Systems Magazine, Jun. 2012, IEEE, pp. 32-74.
Nikrityuk, P.A. et al., "Contactless Mixing of Liquid Metals," Metallurgical and Materials Transactions B, vol. 41B, Feb. 2010, pp. 94-111.
Nisar, A. et al., "MEMS-based micropumps in drug delivery and biomedical applications," Sensors and Actuators B, vol. 130, published online Dec. 2007, Elsevier B.V., pp. 917-942.

Park, H.M. et al., "An Efficient Method of Solving the Navier-Stokes Equations for Flow Control," International Journal for Numerical Methods in Engineering, vol. 41, Dec. 1998, John Wiley & Sons, Ltd., pp. 1133-1151.
Peng, Y. et al., "Experimental Study on Alternating Magnetic Field Magnetohydrodynamic Pump," Journal of Hydrodynamics, vol. 20, Oct. 2008, pp. 591-595.
Posta, M. et al., "Optimal control of Navier-Stokes equations by Oseen approximation," Computers and Mathematics with Applications, vol. 53, Feb. 2007, Elsevier Ltd., pp. 569-581.
Ramos, A. et al., "Ac electrokinetics: a review of forces in microelectrode structures," Journal of Physics D: Applied Physics, vol. 31, No. 18, Sep. 1998, IOP Publishing, pp. 2338-2353.
Ravindran, S.S., "A reduced-order approach for optimal control of fluids using proper orthogonal decomposition," International Journal for Numerical Methods in Fluids, vol. 34, Nov. 2000, John Wiley & Sons, Ltd., pp. 425-448.
Raymond, J.-P., "Feedback Boundary Stabilization of the Two Dimensional Navier-Stokes Equations," SIAM Journal on Control and Optimization, vol. 45, Issue 3, 2006, 33 pages.
Ring, B. et al., "Design and Implementation of a Low Cost Particle Image Velocimetry System for Undergraduate Research and Education," 121st ASEE Annual Conference & Exposition, Jun. 15-18, 2014, Indianapolis, IN, 12 pages.
Roubicek, T. et al., "Lipschitz stability of optimal controls for the steady-state Navier-Stokes equations," Control and Cybernetics, vol. 32, No. 3, Jan. 2003, pp. 683-705.
Ryerson, W. et al., "A simple, inexpensive system for digital particle image velocimetry (DPIV) in biomechanics," Journal of Experimental Zoology Part A: EcologicalGenetics and Physiology, vol. 317, No. 2, Feb. 2012, pp. 127-140.
Sai, K.S. et al., "Magnetohydrodynamic flow in a rectangular duct with suction and injection," Acta Mechanica, vol. 140, Issue 1, 2000, pp. 57-64.
Saito, M. et al., "Induction MHD Generator Using Alternating Magnetic Field," Journal of Nuclear Science and Technology, vol. 16, No. 3, Mar. 1979, pp. 161-174.
Salmanzadeh, A. et al., "Microfluidic mixing using contactless dielectrophoresis," Electrophoresis, vol. 32, Sep. 2011, Wiley-VCH Verlag GmbH & Co. KGaA, Weinheim, pp. 2569-2578.
Saville, D.A., "Electrohydrodynamics: The Taylor-Melcher Leaky Dielectric Model," Annual Review of Fluid Mechanics, vol. 29, Jan. 1997, pp. 27-64.
Selimli, S. et al., "MHD numerical analyses of hydrodynamically developing laminar liquid lithium duct flow," International Journal of Hydrogen Energy, vol. 40, Feb. 2015, Hydrogen Energy Publications, LLC published by Elsevier Ltd., pp. 15358-15364.
Sewell, G., "PDE2D: Easy-to-use software for general two-dimensional partial differential equations," Advances in Engineering Software, vol. 17, No. 2, 1993, Elsevier Science Publishers Ltd., pp. 105-112.
Shercliff, J.A., "The Theory of Electromagnetic Flow-Measurement," Book Notes, Feb. 1963, pp. 153-154.
Shirsavar, R. et al., "Electrically rotating suspended films of polar liquids," Expermients in Fluids, vol. 50, Aug. 2010, Springer, pp. 419-428.
Shirsavar, R. et al., "Rotational regimes of freely suspended liquid crystal films under electric current in presence of an external electric field," Microfluid Nanofluid, vol. 13, Feb. 2012, Springer-Verlag, pp. 83-89.
Siegel, R. et al., "Cancer Statistics, 2014," CA: A Cancer Journal for Clinicians, vol. 64, No. 1, Jan./Feb. 2014, pp. 9-29.
Sin, M. et al., "Electrothermal Fluid Manipulation of High-Conductivity Samples for Laboratory Automation Applications," Journal of the Association for Laboratory Automation (JALA), vol. 15, No. 6, Dec. 2010, Society for Laboratory Automation and Screening, pp. 426-432.
Smolyanov, I. et al., "Shape Optimization of Laboratory Induction Pump," 2018 IEEE Conference of Russian Young Researchers in Electrical and Electronic Engineering (EIConRus), Jan. 29-Feb. 1, 2018, pp. 793-798.
Sritharan, S.S., "Optimal Control of Viscous Flow," Society for Industrial and Applied Mathematics (SIAM), 1998, pp. vii-ix.

(56) References Cited

OTHER PUBLICATIONS

Stefani, F. et al., "Forward and inverse problems in MHD: Numerical and experimental results," GAMM-Mitteilungen, vol. 30, No. 1, Apr. 2007, Wiley-VCH Verlag GmbH & Co. KGaA, Weinheim, pp. 159-170.

* cited by examiner

ROBOTIC DEVICES USING MAGNETIC FIELDS FOR THREE-DIMENSIONAL CONTROL OF FLUIDS

CROSS-REFERENCE TO RELATED APPLICATION(S)

This application claims benefit of U.S. Provisional Patent Application No. 63/146,384 filed on Feb. 5, 2021, wherein the entire contents of the foregoing application are hereby incorporated by reference herein.

TECHNICAL FIELD

This disclosure relates to robotic devices, including robotic devices using magnetic fields for three-dimensional control of fluids.

BACKGROUND

Fluid flows can be controlled using mechanical and chemical actuation of fluids, magnetic actuation of magnetic fluids, electrical actuation of electrically conductive fluids, and MagnetoFluidDynamic (MFD) approaches for control of electrically conductive fluids. However, fluid flow manipulation, controlling flow stability, flow measurement and mixing, and non-contact 3D control of conductive fluids have yet to be realized.

In general, fluid flow can be controlled with a variety of techniques, including mechanical and chemical actuation of fluids, magnetic actuation of magnetic fluids, electrical actuation of electrically conductive fluids, and MFD approaches for control of electrically conductive fluids. For electrical actuation of electrically conductive fluids, electrohydrodynamics and manipulating fluid flows using electric fields and currents have been explored for a variety of applications. These methods require contact with electrodes, and flow patterns allowed by electrode placement are limited. Furthermore, chemical reactions such as oxidation, reduction, and electrolysis may also occur between liquid and container materials in the presence of electricity.

MFD is the study of the behavior of electrically conductive fluids when acted on by a magnetic field. Despite progress, 3D control of conductive fluids has yet to be realized. Systems are unable to precisely control the fluid's velocity field in 3D due to the one-variable control scheme. For example, DC electromagnets can reduce the flow rate by causing one-dimensional forces in the direction opposite to the flow direction, and AC electromagnets can cause oscillating rotational forces around one axis.

Optimal flow control problems are one of the most challenging control problems in computational engineering and science, and thus, for many years controlling 3D fluid flow has remained an unsolved problem.

Accordingly, although there are several studies on steady-state and time-dependent control, contactless and a time-dependent 3D control of vorticity equation has not been achieved.

SUMMARY

Disclosed is a flow control system for three-dimensional (3D) control of fluids with a high spatiotemporal resolution using alternating magnetic fields. This technology is applicable to many disciplines, including fluid dynamics, microfluidics, electrochemistry, metallurgy, and healthcare. In particular, the proposed technique can address challenging problems such as turbulence control, drag reduction, contactless mixing, crystal growth control, and targeted drug delivery.

In one aspect, the disclosure relates to a flow control system including at least one articulating robotic arm having six degrees of freedom. Each at least one articulating robotic arm includes a magnet at an end thereof. The flow control system further includes a processor device in communication with the at least one articulating robotic arm. The processor device is configured to control three-dimensional vorticity of a conductive fluid using magnetic fields by positioning each of the at least one articulating robotic arm relative to the conductive fluid.

In certain embodiments, the magnet comprises a permanent magnet.

In certain embodiments, the magnet is configured to rotate around an axis perpendicular to a magnetic axis of the magnet.

In certain embodiments, the magnet comprises an electromagnetic coil.

In certain embodiments, the processor device is further configured to control the magnetic field of the magnet by controlling frequency and magnitude of electrical current in the electromagnetic coil.

In certain embodiments, the at least one articulating robotic arm comprises three articulating robotic arms.

In certain embodiments, the at least one articulating robotic arm comprises more than three articulating robotic arms.

In certain embodiments, the processor device is further configured to move the at least one articulating robotic arm for time-dependent three-dimensional control of vorticity of the conductive fluid.

In certain embodiments, the processor device is further configured to receive a desired vorticity of the conductive fluid, determine a desired magnetic field to apply to the conductive fluid to achieve the desired vorticity, and determine, for each of the at least one articulating robotic arm, a characteristic of the corresponding magnet relative to the conductive fluid. The characteristic can include at least one of a position of the corresponding magnet relative to the conductive fluid, an electrical current through the corresponding magnet, or a rotation speed of the corresponding magnet.

In certain embodiments, the flow control system further includes Hall effect current sensors. The processor device is further configured to receive measurements from the Hall effect current sensors and adjust at least one of an electrical current or position for the magnet of at least one of the at least one articulating robotic arm.

In certain embodiments, the flow control system further includes a particle image velocimetry (PIV) system in communication with the processor device, the PIV system including a camera to obtain fluid flow data of the conductive fluid.

In another aspect, the disclosure relates to a method of flow control, including receiving, at a processor device, a desired vorticity of a conductive fluid. The method further includes determining, by the processor device, a desired magnetic field to apply to the conductive fluid to achieve the desired vorticity. The method further includes controlling, by the processor device, positioning of at least one articulating robotic arm with a magnet at an end thereof relative to the conductive fluid to control three-dimensional vorticity of the conductive fluid. Each at least one articulating robotic arm has six degrees of freedom.

In certain embodiments, the magnet includes a permanent magnet.

In certain embodiments, the method further includes rotating the magnet around an axis perpendicular to a magnetic axis of the magnet.

In certain embodiments, the magnet includes an electromagnetic coil.

In certain embodiments, the method further includes controlling, by the processor device, frequency and magnitude of electrical current in the electromagnetic coil to control the magnetic field of the magnet.

In certain embodiments, the method further includes moving, by the processor device, the at least one articulating robotic arm for time-dependent three-dimensional control of vorticity of the conductive fluid.

In certain embodiments, the method further includes receiving, by the processor device, a desired vorticity of the conductive fluid. The method further includes determining, by the processor device, a desired magnetic field to apply to the conductive fluid to achieve the desired vorticity. The method further includes determining, by the processor device, for each of the at least one articulating robotic arm, at least one of an electrical current or position of the corresponding magnet relative to the conductive fluid.

In certain embodiments, the method further includes receiving, by the processor device, measurements from Hall effect current sensors. The method further includes adjusting, by the processor device, at least one of an electrical current or position for the magnet of at least one of the at least one articulating robotic arm.

In certain embodiments, the method further includes receiving, by the processor device, fluid flow data of the conductive fluid obtained through a camera of a PIV system.

In another aspect, any one or more aspects or features described herein may be combined with any one or more other aspects or features for additional advantage.

Other aspects and embodiments will be apparent from the detailed description and accompanying drawings.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1A:
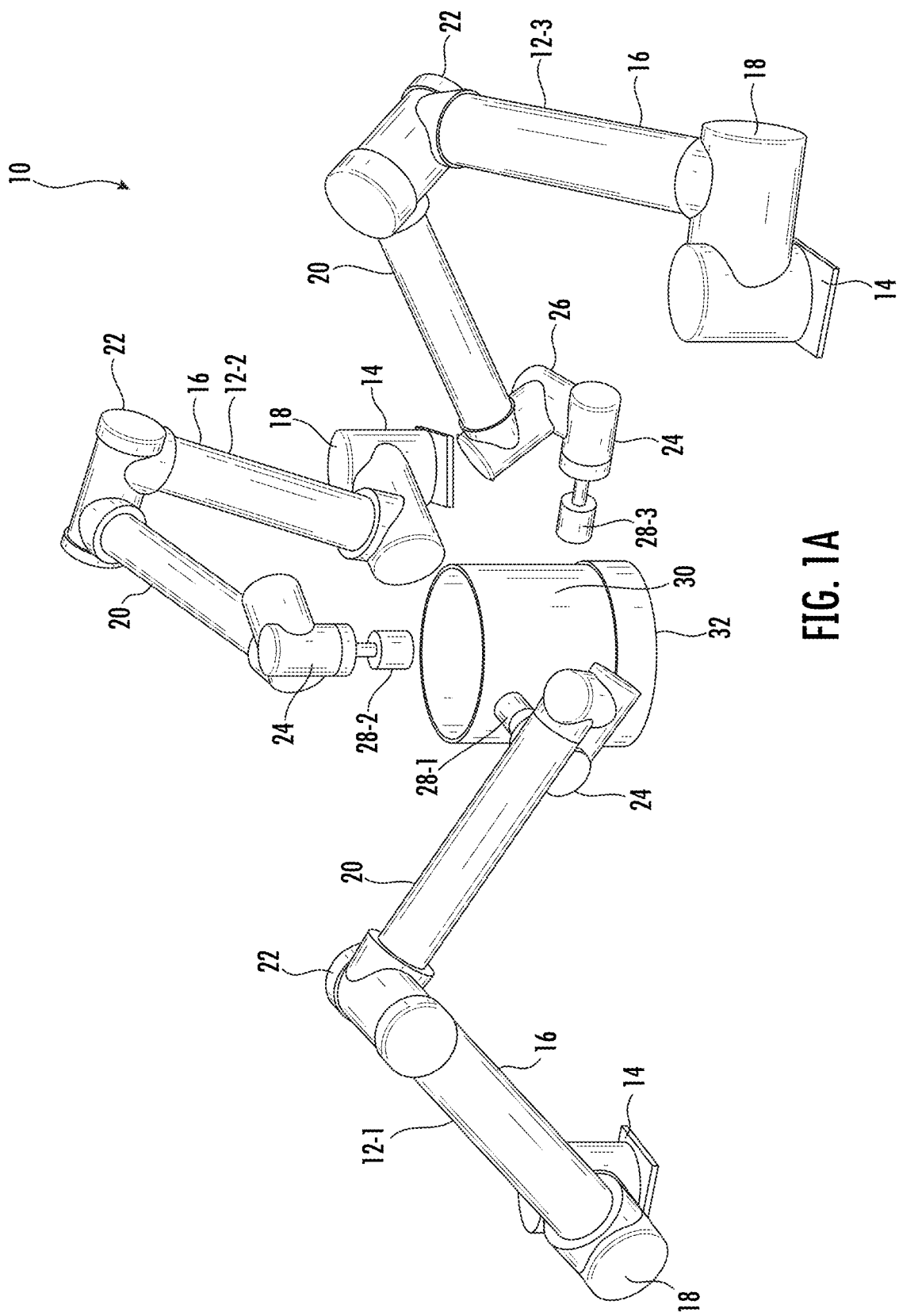
FIG. 1A is a perspective view of one embodiment of a flow control device including permanent magnets.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element, or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Disclosed is an electromagnetic approach for three-dimensional (3D) control of fluids with a high spatiotemporal resolution. A method is disclosed for remotely controlling conductive fluids in 3D using alternating magnetic fields. This technology is applicable to many disciplines, including fluid dynamics, microfluidics, electrochemistry, metallurgy, and healthcare. In particular, the proposed technique can address challenging problems such as turbulence control, drag reduction, contactless mixing, crystal growth control, and/or targeted drug delivery. Such a configuration may be especially suited for biological applications (e.g., elimination of viruses, such as COVID-19) as the magnetic field can easily penetrate biological materials with negligible interaction with the biological material. See, e.g., Evgeny Bryndin, Vibration Approach to Coronavirus Detection and Neutralization COVID-19, *American Journal of Laboratory Medicine*, Vol. 5, No. 4, 2020, pp. 113-117; Eric C. Dykeman, et al., Low Frequency Mechanical Modes of Viral Capsids: An Atomistic Approach, Physical Review Letters, PRL 100, 028101 (2008), the subject matter thereof incorporated herein by reference. In certain embodiments, applying nonuniform magnetic fields (e.g., alternating magnetic fields) to an aqueous solution creates hydrodynamic flow, where the applied magnetic fields lead to creation of an electric current inside the fluid which interacts with the magnetic field. In this way, an extra electric current is not necessary for rotational motion. The salt concentration of the solution may affect the strength of the induced flow. Further, the velocity of motion depends on the magnitude and frequency of the magnetic field.

Disclosed below is the modeling of alternating magnetic fields and solving the inverse problem of calculating magnetic fields for desired fluid flows, control of alternating magnetic fields to achieve desired fluid flows in time and space, and experimental verification of alternating magnetic field modeling and control. Embodiments disclosed herein provide modeling and control of fluid flow in 3D through integration of electromagnetism, control theory, and fluid dynamics. In particular, the approach disclosed herein may be used for finding and controlling the magnetic fields for achieving desired 3D fluid flows in complex environments.

Figure 1B:
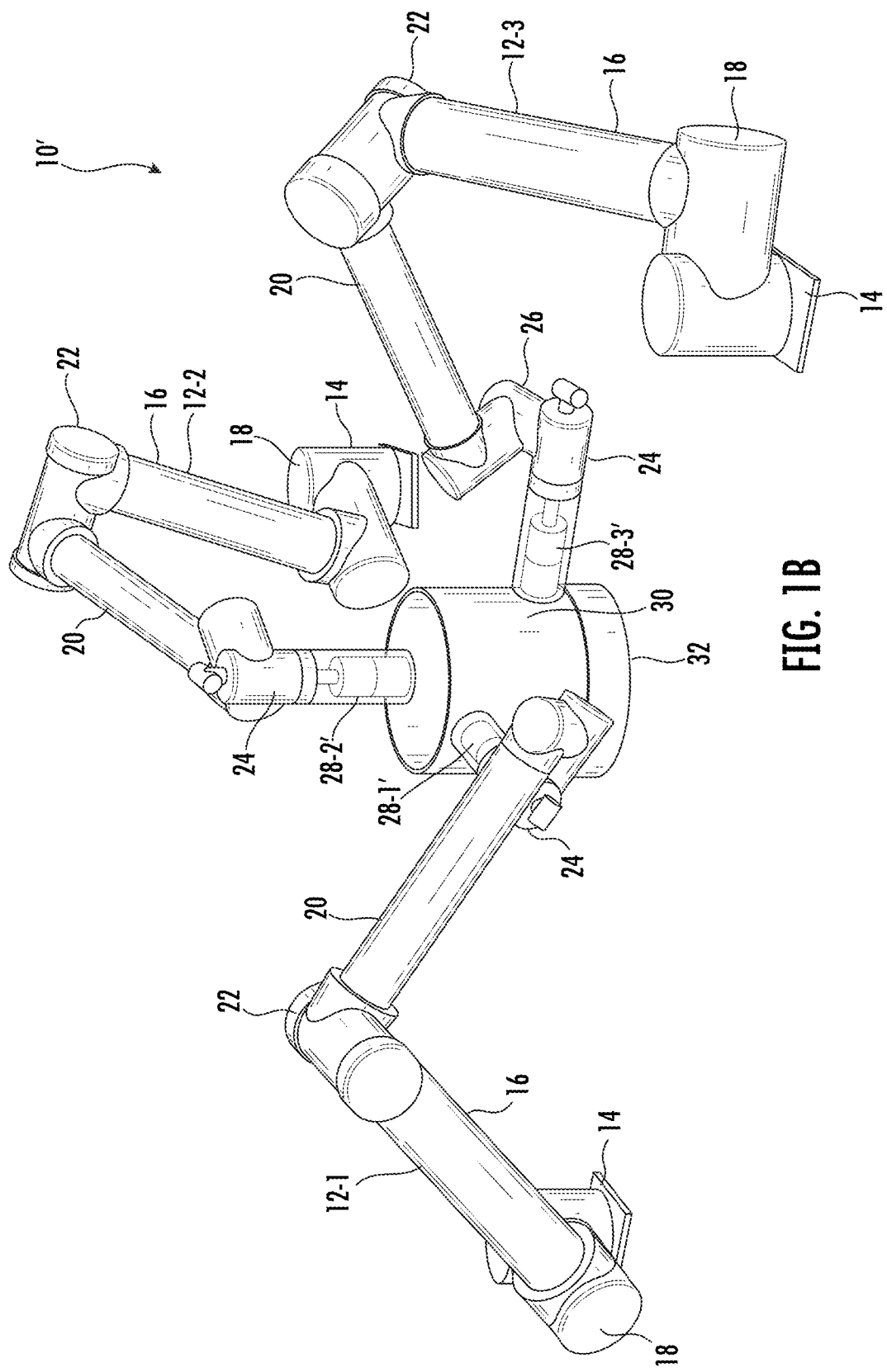
FIG. 1B is a perspective view of another embodiment of the flow control device including electromagnets.

FIGS. 1A-1B are embodiments of a flow control device 10 (may also be referred to as a robotic device), including three articulating robotic arms 12-1-12-3 (referred to generally as robotic arms 12) and a container with a conductive fluid therein. Each of the three articulating robotic arms 12 has six degrees of freedom (able to translate in three degrees and rotate in three degrees). In particular, each articulating robot arm 12 includes a base 14 connected to a lower arm portion 16 by a lower hinge joint 18. Each articulating robot arm 12 further includes an intermediate arm portion 20 connected to the lower arm portion 16 by an intermediate hinge joint 22. Each articulating robot arm 12 further includes an upper arm portion 24 connected to the intermediate arm portion 20 by an upper hinge joint 26. Each articulating robotic arm 12 includes a magnet 28-1-28-3 (referred to generally as magnet 28) at an end thereof. In particular, the magnet 28 is connected to the upper arm portion 24. In certain embodiments, the at least one articulating robotic arm 12 comprises three articulating robotic arms 12. However, in certain embodiments, the flow control system may include more than three articulating robotic arms 12. Although hinge joints 18, 22, 26 are shown and described, in certain embodiments, ball and socket joints may be used in addition or instead of the hinge joints 18, 22, 26.

Referring to FIG. 1A, in certain embodiments, the magnet 28 comprises a permanent magnet 28 and is configured to rotate around an axis perpendicular to a magnetic axis of the magnet (e.g., around a spindle). In this way, the magnet 28 is configured to rotate relative to the upper arm portion 24 of the robotic arm 12. Three permanent magnets 28 are used to generate an alternating magnetic field in the space. Each of these magnets 28 can rotate in place and are controlled/moved with a robotic arm 12. By changing the robot's end-effector configuration, the magnetic field in the space changes. As a result of the changes in the magnetic field, the vorticity generated in a conductive fluid 30 within a container 32 changes. Vorticity describes a local spinning motion of a continuum near a point (i.e., tendency of something to rotate). Accordingly, such a configuration allows for controlling the fluid flow in 3D.

Referring to FIG. 1B, in certain embodiments, the magnet 28-1'-28-3' (referred to generally as magnet 28') comprises an electromagnetic coil. The flow control device 10' uses three perpendicular electromagnetic coils 28' that are used for generating alternative magnetic fields. A processor device (discussed below) is further configured to control the magnetic field of the magnet 28' by controlling frequency and magnitude of electrical current in the electromagnetic coil 28'. By controlling the electrical current's frequency and magnitude in each of these coils 28', the magnetic field can be controlled. The position and orientation of each coil 28' can also be controlled using the robotic arm 12. Accordingly, such a configuration allows for the control of the fluid flow in 3D as the three electromagnets 28' enable the control of magnetic fields in 3D.

Figure 2:
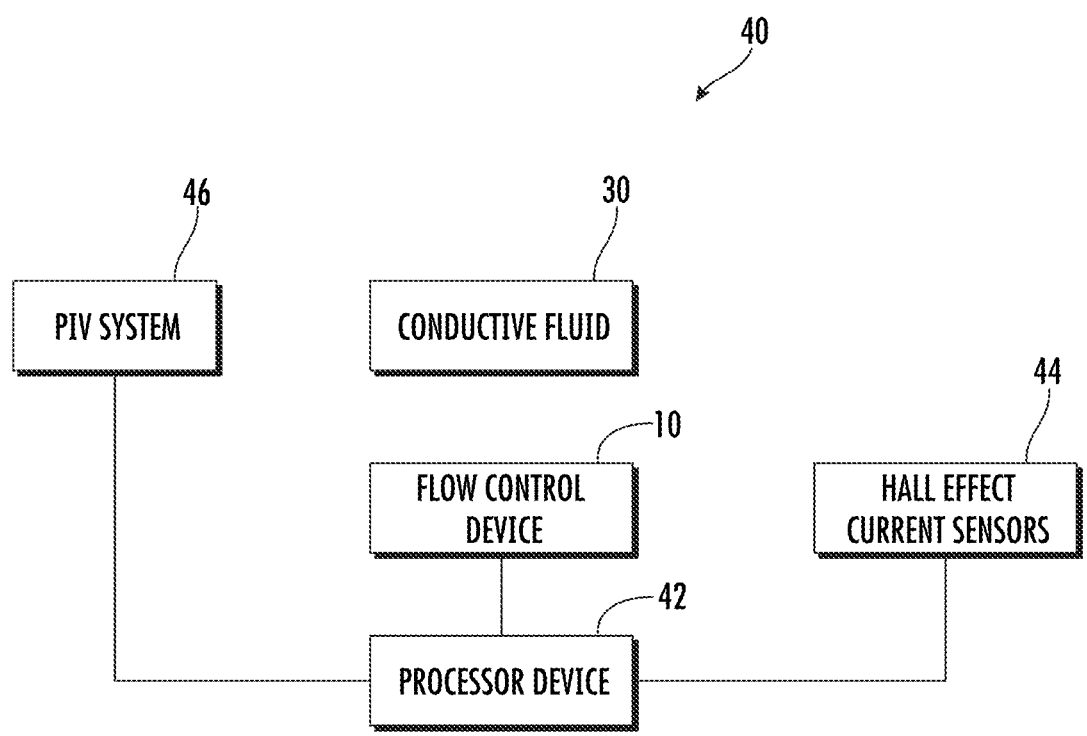
FIG. 2 is a block diagram of a flow control system including the flow control device of FIGS. 1A-1B.

FIG. 2 is a block diagram illustrating a flow control system 40 including a flow control device 10 (as illustrated in FIGS. 1A and 1B). The flow control system 40 includes a processor device 42 in communication with the flow control device 10 (e.g., articulating robotic arms 12). The processor device 42 is configured to control three-dimensional vorticity of a conductive fluid 30 using magnetic fields by positioning each of the at least one articulating robotic arm 12 (and the magnets 28 thereof) relative to the conductive fluid 30. In certain embodiments, the processor device 42 is further configured to move the at least one articulating robotic arm 12 for time-dependent 3D control of vorticity of the conductive fluid 30.

In certain embodiments, the processor device 42 is further configured to receive a desired vorticity of the conductive fluid 30, determine a desired magnetic field to apply to the conductive fluid 30 to achieve the desired vorticity, and determine, for each of the at least one articulating robotic arm 12, a characteristic of the corresponding magnet 28 relative to the conductive fluid 30. The characteristic can include at least one of a position of the corresponding magnet 28 relative to the conductive fluid 30, an electrical current through the corresponding magnet 28, or a rotation speed of the corresponding magnet 28.

In certain embodiments, the flow control system 40 further includes sensors, such as Hall effect current sensors 44. The processor device 42 is further configured to receive measurements from the Hall effect current sensors 44 and adjust at least one of an electrical current or position for the magnet 28 of at least one of the at least one articulating robotic arm 12. In certain embodiments, the flow control system 40 further includes a particle image velocimetry (PIV) system 46 in communication with the processor device 42, the PIV system 46 including a camera to obtain fluid flow data of the conductive fluid 30.

Figure 3:
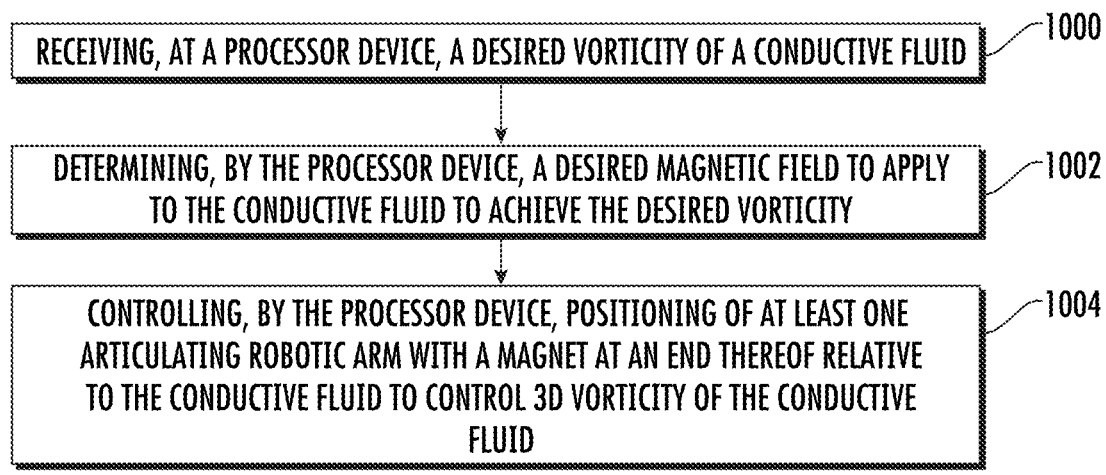
FIG. 3 is a flowchart of a method of controlling fluid using the flow control device of FIGS. 1A-1B and/or the flow control system of FIG. 2.

FIG. 3 is flowchart of a method of flow control. The method includes receiving, at a processor device 42, a desired vorticity of a conductive fluid 30 (1000). The method further includes determining, at the processor device 42, a desired magnetic field to apply to the conductive fluid 30 to achieve the desired vorticity (1002). The method further includes controlling, by the processor device 42, positioning of at least one articulating robotic arm 12 with a magnet 28 at an end thereof relative to the conductive fluid 30 to control 3D vorticity of the conductive fluid 30 (1004). Each at least one articulating robotic arm 12 has six degrees of freedom.

In certain embodiments, the method further includes moving, by the processor device 42, the at least one articulating robotic arm 12 for time-dependent three-dimensional control of vorticity of the conductive fluid 30.

In certain embodiments, the method further includes receiving, by the processor device 42, a desired vorticity of the conductive fluid 30. The method further includes determining, by the processor device 42, a desired magnetic field to apply to the conductive fluid 30 to achieve the desired vorticity. The method further includes determining, by the processor device 42, for each of the at least one articulating robotic arm 12, at least one of an electrical current or position of the corresponding magnet 28 relative to the conductive fluid 30.

In certain embodiments, the method further includes receiving, by the processor device 42, measurements from Hall effect current sensors. The method further includes adjusting, by the processor device 42, at least one of an electrical current or position for the magnet 28 of at least one of the at least one articulating robotic arm 12.

In certain embodiments, the method further includes receiving, by the processor device 42, fluid flow data of the conductive fluid 30 obtained through a camera of a PIV system.

Disclosed herein is modeling of alternating magnetic field and solving the inverse problems of calculating magnetic fields for desired fluid flows. It is noted that such features may be performed by the processor device discussed above. The modeling approach can be applied to any conductive, incompressible, homogeneous, electrically neutral, and Newtonian fluids. This model can be used to find magnetic fields for attaining desired 3D fluid flows (e.g., 3D velocity and/or 3D vorticity). A control strategy is discussed to control the desired flow in time and space (i.e., achieve desired 3D fluid flows). Also disclosed herein is exemplary experimental results of alternating magnetic field modeling and control for achieving desired fluid flows.

MFD may be used for time-dependent control of electrically conductive fluids in 3D remotely. Non-contact 3D fluid flow control system using MFD requires solving the inverse problem of finding the magnetic field for achieving desired 3D fluid flow. Below is a technique for modeling the conductive fluid flow with electromagnetic body forces (e.g., for use by the processor device of the flow control system). This mathematical model can then be used to find the magnetic field for desired 3D fluid flows and, thus, to control the flow in 3D.

In certain embodiments, the flow control system 40 may be used to destroy viruses by hydrodynamic flow. For example, viral capsids are water permeable and a controlled flow near or inside a viral capsid can damage the capsid and lead to inactivation of the virus.

Below is a background for the effect of external electric and magnetic fields and currents on the velocity of a conductive fluid 30. For an incompressible, homogeneous, and Newtonian conductive fluid 30, the vorticity equation reduces to the following form:

$$\nabla \times \vec{F} = \rho \left[ \frac{\partial \vec{\omega}}{\partial t} + (\vec{v} \cdot \nabla)\vec{\omega} - (\vec{\omega} \cdot \nabla)\vec{v} - \nabla \times (\nu \nabla^2 \vec{v}) \right] \quad (1)$$

where $\vec{F}$ is the body force, $\rho$ is fluid density, $\omega$ is vorticity, $\vec{v}$ is velocity, and $\nu$ is the kinematic viscosity. The electric and magnetic forces per unit volume, $F_E$ and $F_M$, in a fluid can be obtained as:

$$\begin{cases} \vec{F}_E = \rho_e \vec{E} + \nabla(\vec{P} \cdot \vec{E}), \\ \vec{F}_M = \vec{J} \times \vec{B} + \nabla(m \cdot \vec{B}), \end{cases} \quad (2)$$

where $\vec{E}$ and $\vec{B}$ are electric and magnetic fields, $\rho_e$ and $\vec{J}$ are electric charges and current densities, and $\vec{P}$ and $\vec{m}$ are electric and magnetic dipole moments.

Using Maxwell's equations along with the charge conservation equation for an electrically neutral fluid ($\rho_e = 0$), one obtains:

$$\nabla \times \vec{F}_{E,M} = \nabla \times \vec{F}_E + \nabla \times \vec{F}_M = (\vec{B} \cdot \nabla)\vec{J} - (\vec{J} \cdot \nabla)\vec{B} \quad (3)$$

Assume that the magnetic field $\vec{B}$ in the right-hand side of Eq. 3 can be approximated by the external magnetic field. This implies neglecting the contributions from the magnetic polarizations of the fluid. Therefore, Eqs. 1 and 3 become equal to each other:

$$(\vec{B} \cdot \nabla)\vec{J} - (\vec{J} \cdot \nabla)\vec{B} = \rho[\partial \vec{\omega}/\partial t + (\vec{v} \cdot \nabla)\vec{\omega} - (\vec{\omega} \cdot \nabla)\vec{v} - \nabla \times (\nu \nabla^2 \vec{v})] \quad (4)$$

Furthermore, from Maxwell's equations and the Einstein-Nernst equation ($J = \sigma E - D \nabla \rho_e$, where $\sigma$ and $D$ are conductivity and diffusion coefficients of the liquid, respectively), we find the following equation for an electrically neutral fluid:

$$\nabla \times \vec{J} = -\sigma \partial \vec{B}/\partial t \quad (5)$$

Thus, substituting $\vec{w} = \nabla \times \vec{v}$ in Eq. 4 reframes the problem in terms of (the desired fluid flow as the input) and B (the magnetic field as the output).

According to Maxwell's equations, alternating magnetic field inside a conductive fluid induces an electric field, and from the Einstein-Nernst equation, the induced electric field can produce electric current in the fluid. An alternating magnetic field $\vec{B}$ is applied, with a frequency of f on a conductive fluid. The alternating magnetic field induces an alternating electric current with the same frequency f. The interaction of the induced alternating electric current and the applied alternating magnetic field can produce fluid flow if $(\vec{B}\cdot\nabla)\vec{J}-(\vec{J}\cdot\nabla)\vec{B}$ is non-zero. Eq. 4, which is derived for incompressible, homogeneous, Newtonian, and electrically neutral fluids, can then be solved to find the magnetic field $\vec{B}$ for a desired fluid flow $\vec{v}$ (e.g., desired vorticity).

The equation for finding magnetic fields for desired 3D fluid flows includes a vorticity equation with electromagnetic body forces for incompressible, homogeneous, Newtonian, electrically neutral, conductive fluids (Eq. 4).

There are several approaches for solving systems of Nonlinear Partial Differential Equations (PDEs). A discretization method is usually used to discretize the domain, all functions, their derivatives, and boundary conditions. A nonlinear iterative technique such as Newton, Oseen, least-squares, or Peaceman-Racheford method can be used to solve the discretized problem numerically. Depending on the problem definition (e.g., the type of PDEs, spatial dimension of the problem, and boundary conditions), analytical techniques and numerical methods are used, particularly finite element/finite difference packages such as PDE2D and the ANSYS Fluent MagnetoHydroDynamic (MHD) module may be executed by the processor device to solve and analyze the inverse problems described.

PDE2D is a general-purpose finite element program developed in FORTRAN that can solve nonlinear, time-dependent, and eigenvalue systems of PDEs in 1 D, 2D, and a wide range of simple 3D regions (such as rectangles, spheres, cylinders, tori, ellipsoids, parallelepipeds, and many others). For 1D and 2D problems, the PDE2D offers both the collocation and Galerkin methods, and for 3D problems, PDE2D uses a collocation finite element method. Newton's method is used to solve the nonlinear algebraic equations resulting from the collocation or Galerkin method formulation. There are also several options available to solve the linear systems, such as Harwell sparse direct solvers, frontal method, and conjugate-gradient methods. The PDE2D program may be used to solve a wide range of inverse problems proposed, and some preliminary results using this program are presented below.

The ANSYS Fluent MHD module of Fluent is capable of both 2D and 3D analyses of electrically conductive fluids in the presence of electric and magnetic fields. Moving or stationary magnetic fields described by oscillating AC, DC, or by components of both can be applied through built-in functions or by importing a custom magnetic field data file. Both steady-state and transient models are also supported. The MHD module may be used to verify the solution of the inverse problems by inputting the calculated magnetic field, solving for the velocity or vorticity field, and comparing it to the desired fluid flow (e.g., desired vorticity). Some preliminary results using this module are presented below.

Figure 4A:
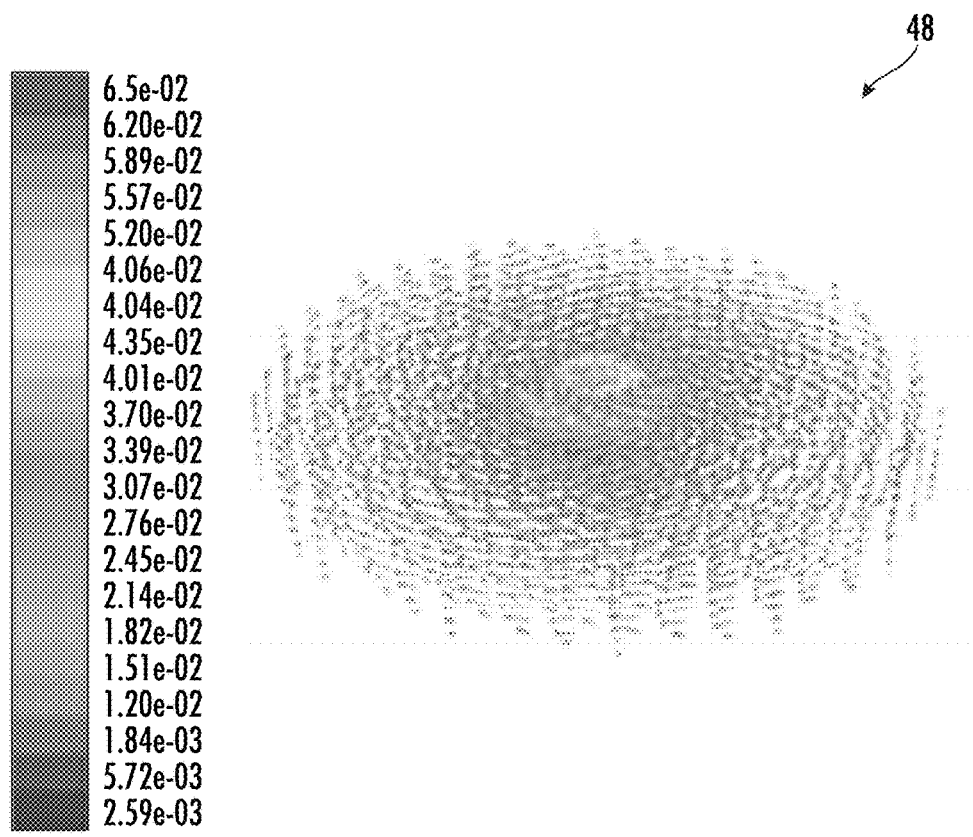
FIG. 4A is a diagram of ANSYS Fluent MagnetoHydro-Dynamic (MHD) results for velocity magnitudes.
Figure 4B:
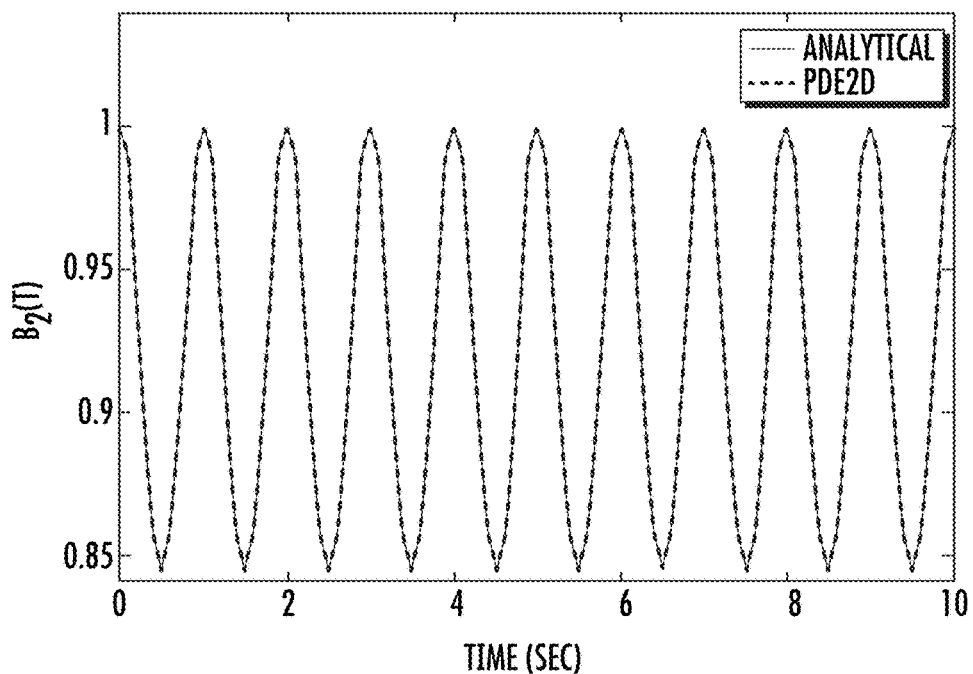
FIG. 4B is a diagram of PDE2D analytical results for an alternating magnetic field to generate a force in saltwater.

FIG. 4A provides ANSYS Fluent MHD preliminary results 48 for velocity magnitudes generated by a stationary 0.1 T permanent magnet, and an electric voltage of 4.5 V applied to the center of a 10 cm diameter Petri dish filled with saltwater. FIG. 4B provides PDE2D analytical results 49 for an alternating magnetic field to generate a force of $F_r(r, t)=2 \sin(2\pi t)$ in saltwater in a 10 cm diameter Petri dish.

For an alternating magnetic field for generating a 2D fluid flow, disclosed is a method and preliminary data on a solution of the inverse Navier-Stokes problem to find a magnetic field for generating a 2D fluid flow. In this example, saltwater is the media for which both α and β are negligible. By plugging a desired velocity vector into this equation, the force per unit volume F corresponding to the desired velocity field can be determined. Since $\vec{J}\times\vec{B}=\vec{F}$, one possible combination of $\vec{B}$, $\vec{J}$, and $\vec{F}$ would be a uniform alternating magnetic field perpendicular to the plane of $\vec{F}$ and $\vec{J}$, which induces a rotating $\vec{J}$ (e.g., vorticity).

A first-order Ordinary Differential Equation (ODE) for a magnetic field corresponding to the desired fluid flow (e.g., vorticity) is:

$$\frac{-\sigma r}{2} B_z \frac{\partial B_z}{\partial t} = F_r(r, t) \qquad (6)$$

To simplify the calculations, the force is $F_r(r,t)=ar\sin(bt)$, where a and b are constants. Considering an initial condition of $B_z(0)=1$ T, the solution for Bz is as follows:

$$B_z = \sqrt{\frac{4a}{\sigma b}(\cos(bt)-1)+1} \qquad (7)$$

The inverse problem for this case is solved using the PDE2D program to find the magnetic field for generating the desired force, $F_r(r,t)=ar\sin(bt)$, and the result matches our analytical solution for Bz presented in Eq. 7 (FIG. 4B). These plots are made using $a=\frac{1}{2}$ and $b=2\pi$.

Control of alternating magnetic field to achieve desired 3D fluid flows include control of 2D and 3D Navier-Stokes equations. The control of vorticity in fluids is a powerful technique that could be used in many applications, including propulsion and mixing.

There are several different mathematical approaches for solving optimal control of Navier-Stokes equations, some of which were already mentioned above. Control of the vorticity equation derived in Eq. 4 can describe the MFD phenomena for a wide range of conductive fluids, including nonlinear and anisotropic fluids. Solving the control problem for Eq. 4 allows for remotely controlling fluid flows in time and space for incompressible, homogeneous, Newtonian, electrically neutral, and conductive fluids. Below is optimal control of both Navier-Stokes and vorticity equations with electromagnetic body forces for time-dependent problems.

The control problem for Navier-Stokes and vorticity equations with electromagnetic body forces is formulated below. Since the overall approach for formulating these two cases is similar, only the approach for tackling the vorticity equation is described below. The state equation for designing the controller is the vorticity equation derived for time-dependent, incompressible, homogeneous, Newtonian, electrically neutral, and conductive fluids, which is a third-order nonlinear PDE (Eq. 4). The controller uses Eq. 4 to determine the magnetic field that should be applied to the fluid to achieve the desired velocity field. The optimization problem for this case can be formulated below.

Minimizing the cost function over the domain Ω with $Q=\Omega\times[0, T]$:

$$K=\int_Q \alpha_1|\vec{v}-\vec{v}_d|^2+\alpha_2|\vec{B}-\vec{B}_d|^2+\alpha_3|\nabla\times\vec{F}|^2 dx dt \qquad (8),$$

where $\vec{v}_d$ and $\vec{B}_d$ are the desired velocity and magnetic fields and $a_1$, $a_2$, and $a_3$ are non-negative constants. The first two terms in cost function are to match velocity and magnetic fields to the desired fields, and the last term is also a penalization term to limit the cost of control. $\vec{v}$ can be obtained using PIV techniques. $\vec{B}$ can also be found through precomputed calibration matrix relating coil currents to magnetic fields in the electromagnetic coil system (FIG. 5). $\vec{F}$ can be calculated through Eqs. 3 and 5. This cost function is subjected to:

$$M = \begin{cases} \nabla \times \vec{F} = (\vec{B} \cdot \nabla)\vec{J} - (\vec{J} \cdot \nabla)\vec{B} = \\ \rho\left[\frac{\partial \omega}{\partial t} + (\vec{v} \cdot \nabla)\vec{\omega} - (\vec{\omega} \cdot \nabla)\vec{v} - \nabla \times (\nu\nabla^2\vec{v})\right] \\ \nabla \cdot \vec{v} = 0 \\ \nabla \times \vec{J} = -\sigma\frac{\partial \vec{B}}{\partial t} \\ \nabla \cdot \vec{B} = 0, \end{cases} \quad (9)$$

This problem can be numerically solved using methods such as sequential quadratic programming (SQP), which is an iterative method for nonlinear optimization problems with objective function and constraints that are twice continuously differentiable. Since it is required to know the velocity at each point to solve the optimization problem, this method will be a control technique with complete observation. Real-time PIV will be used to provide feedback enabling closed-loop control of the fluid flow. By solving the optimization problem, the curl of body force and then the required magnetic field can be found using Eq. 3.

To find electric currents for the required magnetic fields after calculating the required magnetic field, the electrical current in each electromagnet to generate such a field must be determined. For a system of stationary electromagnets, the magnetic flux density generated by each of the electromagnets can be precomputed. At any point $\vec{P}$ inside the fluid, $\vec{B}_e(\vec{P})$ expresses the magnetic density flux created by an electromagnet. This magnetic flux density changes linearly by the electrical current which goes through the electromagnet:

$$\vec{B}_e(\vec{P}) = \vec{b}_e(\vec{P})i_e \quad (10)$$

where $\vec{b}_e(\vec{P})$ relates the current to the magnetic flux density, and the subscript e represents the elements related to the eth electromagnet. The magnetic flux density of any point in the fluid is the sum of magnetic fields generated by each electromagnet. Therefore, the magnetic flux density at each point can be expressed as:

$$\vec{B}(\vec{P}) = [\vec{b}_1(\vec{P}) \ldots \vec{b}_n(\vec{P})]\begin{bmatrix} i_1 \\ \vdots \\ i_n \end{bmatrix} = B(\vec{P})\vec{I} \quad (11)$$

where $\vec{I}$ is the electrical current vector. B, which is a 3×n matrix (n is the number of coils), is constructed through an in situ calibration. The electrical current needed in each coil to generate the computed field can be found by left multiplying both sides of Eq. 11 by pseudo-inverse of B.

The singular value decomposition (SVD) method is used to find the pseudo-inverse of $B=U\Sigma V^T$ where $\Sigma$ is the diagonal 3×n singular-value matrix, U is the 3×3 orthonormal matrix which the three output singular vectors are its columns, and V is the 3×3 orthonormal matrix with n input singular vectors as its rows. To find the pseudo-inverse, compute $B^\dagger = V\Sigma^\dagger U^T$. The computed current vector is the desired electrical current vector to generate the desired magnetic field inside the fluid. The actual electrical currents are found using electrical current sensors installed on each electromagnetic coil. Using separate Proportional-Integral-Derivative (PID) controllers for each coil, the actual electrical currents are forced to approach the desired values.

As an example, below is experimental verification of alternating magnetic field modeling and control for achieving desired fluid flows. As described above, the control input is the alternating magnetic field, and the goal is to achieve the desired fluid flow in time and space. The experimental setup includes actuation and sensing systems as described below.

Independently-controlled electromagnetic coils in this system can be used to generate the currents required to produce the desired magnetic fields and their spatial and temporal gradients. An external power source via a linear electronic amplifier can provide the currents in the electromagnetic coils. The amplified current values are then read using Hall effect current sensors to provide feedback for the PID controllers designed to control electrical currents going through each coil.

The 3D velocity profile is tracked using a PIV system, and this feedback is used to control the fluid flow. PIV is a flow visualization technique for obtaining velocity fields in fluids at different points and/or planes. Small tracer particles are usually mixed with the fluid, illuminated, and captured with cameras to obtain fluid flow information.

Experiments included generating time-dependent fluid flows without controls. The inverse solution to Eq. 4 discussed above is used to generate time-dependent fluid flows without any feedback or control.

Experiments further included generating time-dependent fluid flows with controls. Eq. 4 is used to generate controlled time-dependent fluid flows with velocity feedback provided by the PIV system.

Experiments further included performing application-oriented experiments. The proposed approach for 3D fluid flow control is used to steer fluids in a complex array of microfluidic channels, locally mix fluids, control turbulence on the shear flow at a wall, and control fluid separation on a hydrofoil.

FIGS. 5A-5F illustrate generating vorticity in saltwater using stationary and rotating permanent magnets and applying an electric voltage.

Figure 5A:
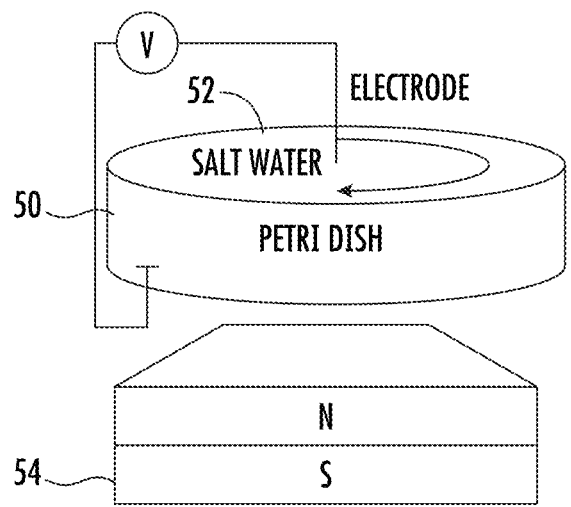
FIG. 5A is a schematic of a setup including a stationary magnet.
Figure 5B:
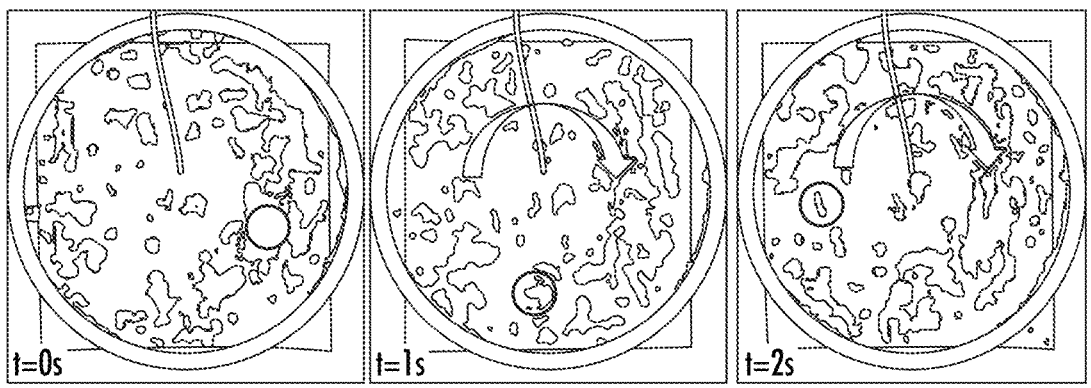
FIG. 5B provides a first image sequence of vorticity generated by the setup of FIG. 5A in a clockwise direction.
Figure 5C:
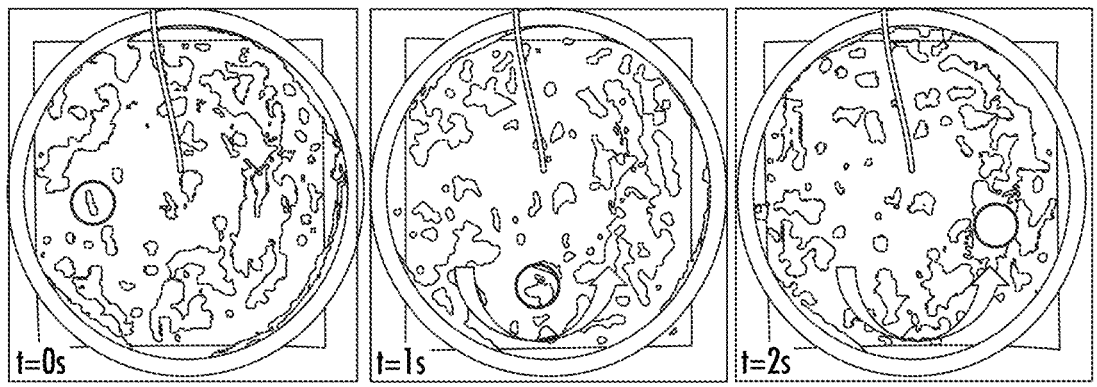
FIG. 5C provides a second image sequence of vorticity generated by the setup of FIG. 5A in a counter-clockwise direction.
Figure 5D:
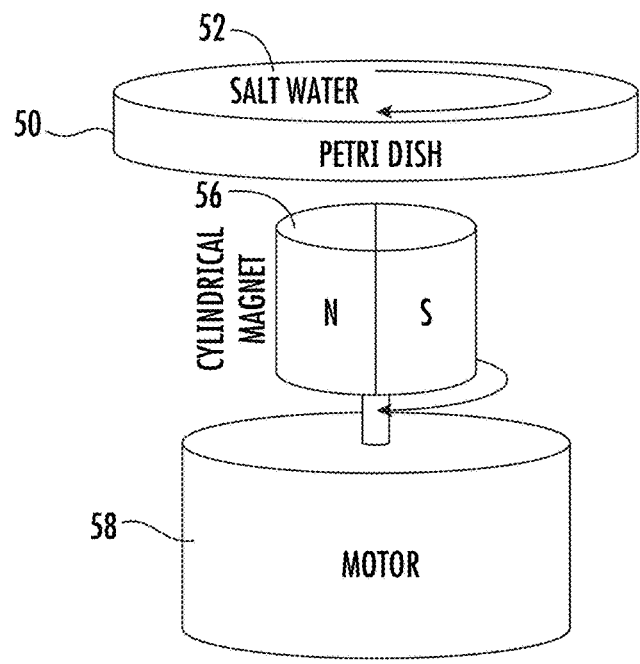
FIG. 5D is a schematic of a setup including a rotating magnet.
Figure 5E:
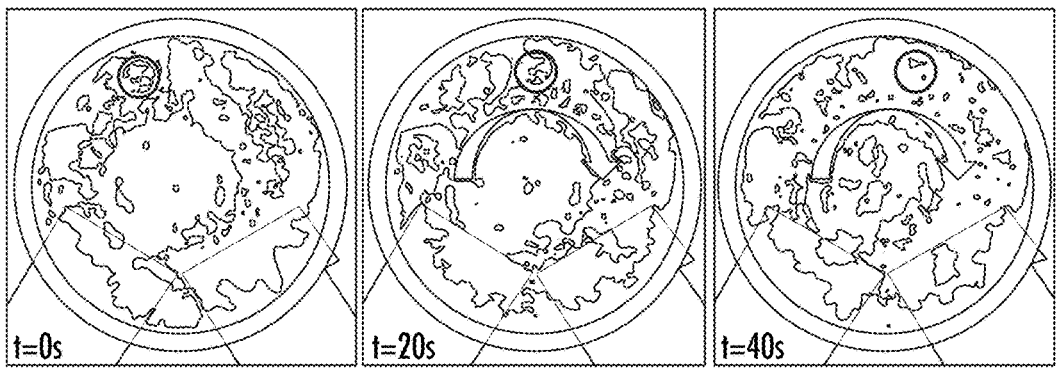
FIG. 5E provides a first image sequence of vorticity generated by the setup of FIG. 5D in a clockwise direction.
Figure 5F:
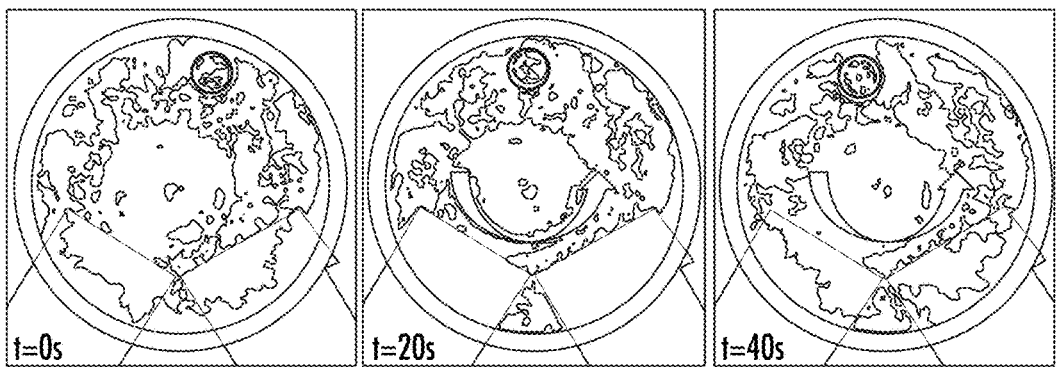
FIG. 5F provides a second image sequence of vorticity generated by the setup of FIG. 5D in a counter-clockwise direction.

FIG. 5A is a schematic of a setup including a stationary magnet. The setup includes a Petri dish 50 containing saltwater 52 above a stationary rectangular magnet 54. FIGS. 5B and 5C each provide an image sequence of vorticity generated in the clockwise and counter-clockwise directions, respectively. FIG. 5D is a schematic of a setup including a rotating magnet. The setup includes a Petri dish 50 containing saltwater 52 with a rotating cylindrical permanent magnet 56 driven by a motor 58. FIGS. 5E and 5F each provide an image sequence of vorticity generated in the clockwise and counter-clockwise directions, respectively. Small pieces of paper are added to the water surface for flow visualization, and circles are drawn to illustrate rotation of the paper tracers.

Referring to FIGS. 5A-5C, a stationary 0.1 T permanent magnet 54 is placed at the bottom of a 10 cm diameter Petri dish filled with saltwater 52 and paper tracers with water for flow visualization. An electric voltage of 4.5 V is applied to the saltwater using an electrode placed at the center of the Petri dish (FIG. 5A), and a vorticity is observed in the Petri dish plane with a direction that depends on the direction of applied voltage (FIGS. 5B and 5C). MHD simulation results for this problem closely match the experimental results.

Referring to FIGS. 5D-5F, remote creation of a vorticity in saltwater using a rotating permanent magnet 56 was also achieved. Saltwater 52 was mixed with paper tracers, poured in a 10 cm diameter Petri dish, and placed on a vibration isolator table. As shown in FIG. 5D, a 0.5 T cylindrical permanent magnet 56 was attached to a DC motor and placed underneath the Petri dish without making any physical connection to either the dish or the vibration isolator table. Rotating the permanent magnet 56 at 500 Hz, the saltwater 52 above the magnet 56 started to rotate in the same direction (FIGS. 5E and 5F). This is due to the fact that the rotating permanent magnet 56 can generate an alternating magnetic field. The interaction of the induced alternating electric current and the applied alternating magnetic field can produce fluid flow because $(\vec{B}\cdot\nabla)\vec{J}-(\vec{J}\cdot\nabla)\vec{B}$ is nonzero.

Those skilled in the art will recognize improvements and modifications to the preferred embodiments of the present disclosure. All such improvements and modifications are considered within the scope of the concepts disclosed herein and the claims that follow.

What is claimed is:

1. A flow control system comprising:
at least one articulating robotic arm having six degrees of freedom, each at least one articulating robotic arm including a magnet at an end thereof, the at least one articulating robotic arm being configured to move relative to a container containing a conductive fluid; and
a processor device in communication with the at least one articulating robotic arm, the processor device configured to control three-dimensional vorticity of the conductive fluid using magnetic fields by adjustment of at least one of: (i) position of the at least one articulating robotic arm relative to the conductive fluid, (ii) an electrical current supplied to the magnet of the at least one articulating robotic arm, or (iii) a rotation of the magnet of the at least one articulating robotic arm around an axis perpendicular to a magnetic axis of the magnet.

2. The flow control system of claim 1, wherein the magnet of the at least one articulating robotic arm comprises a permanent magnet.

3. The flow control system of claim 2, wherein the magnet of the at least one articulating robotic arm is configured to rotate around an axis perpendicular to a magnetic axis of the magnet.

4. The flow control system of claim 1, wherein the magnet of the at least one articulating robotic arm comprises an electromagnetic coil.

5. The flow control system of claim 4, wherein the processor device is configured to control the magnetic field of the magnet of the at least one articulating robotic arm by controlling frequency and magnitude of electrical current in the electromagnetic coil, to permit adjustment of electrical current supplied to the magnet of the at least one articulating robotic arm.

6. The flow control system of claim 1, wherein the at least one articulating robotic arm comprises three articulating robotic arms.

7. The flow control system of claim 1, wherein the at least one articulating robotic arm comprises more than three articulating robotic arms.

8. The flow control system of claim 1, wherein the processor device is configured to adjust position of the at least one articulating robotic arm for time-dependent three-dimensional control of vorticity of the conductive fluid.

9. The flow control system of claim 1, wherein the processor device is further configured to:
receive a desired vorticity of the conductive fluid;
determine a desired magnetic field to apply to the conductive fluid to achieve the desired vorticity; and
determine, for each of the at least one articulating robotic arm, a characteristic of the corresponding magnet relative to the conductive fluid, the characteristic comprising at least one of:
a position of the corresponding magnet relative to the conductive fluid;
an electrical current to be supplied to the corresponding magnet; or
a rotation speed of the corresponding magnet.

10. The flow control system of claim 1,
further comprising Hall effect current sensors;
wherein the processor device is further configured to:
receive measurements from the Hall effect current sensors; and
adjust at least one of an electrical current or position for the magnet of any one or more of the at least one articulating robotic arm.

11. The flow control system of claim 1, further comprising a particle image velocimetry (PIV) system in communication with the processor device, the PIV system including a camera to obtain fluid flow data of the conductive fluid.

12. The flow control system of claim 1, wherein the conductive fluid comprises an aqueous solution.

13. A method of flow control utilizing at least one articulating robotic arm having six degrees of freedom, having a magnet at an end thereof, and being configured to move relative to a container containing a conductive fluid, the method comprising:
receiving, at a processor device, a desired vorticity of a conductive fluid;
determining, by the processor device, a desired magnetic field to apply to the conductive fluid to achieve the desired vorticity; and
controlling, by the processor device, positioning of the at least one articulating robotic arm relative to the conductive fluid, and adjusting at least one of:
position of the at least one articulating robotic arm relative to the conductive fluid, (ii) an electrical current supplied to the magnet of the at least one articulating robotic arm, or (iii) a rotation of the magnet of the at least one articulating robotic arm around an axis perpendicular to a magnetic axis of the magnet, to control three-dimensional vorticity of the conductive fluid.

14. The method of claim 13, wherein the magnet of the at least one articulating robotic arm comprises a permanent magnet.

15. The method of claim 14, further comprising rotating the magnet of the at least one articulating robotic arm around an axis perpendicular to a magnetic axis of the magnet.

16. The method of claim 13, wherein the magnet of the at least one articulating robotic arm comprises an electromagnetic coil.

17. The method of claim 16, further comprising controlling, by the processor device, frequency and magnitude of electrical current in the electromagnetic coil to control the magnetic field of the magnet of the at least one articulating robotic arm.

18. The method of claim 13, comprising adjusting position, by the processor device, the at least one articulating robotic arm for time-dependent three-dimensional control of vorticity of the conductive fluid.

19. The method of claim 13, further comprising:
- receiving, by the processor device, a desired vorticity of the conductive fluid;
- determining, by the processor device, a desired magnetic field to apply to the conductive fluid to achieve the desired vorticity; and
- determining, by the processor device, for each of the at least one articulating robotic arm, at least one of an electrical current or position of the corresponding magnet relative to the conductive fluid.

20. The method of claim 13, further comprising:
- receiving, by the processor device, measurements from Hall effect current sensors; and
- adjusting, by the processor device, at least one of an electrical current or position for the magnet of at least one of the at least one articulating robotic arm.

21. The method of claim 13, further comprising receiving, by the processor device, fluid flow data of the conductive fluid obtained through a camera of a particle image velocimetry (PIV) system.

22. The method of claim 13, wherein the conductive fluid comprises an aqueous solution.

* * * * *